Figure 1:
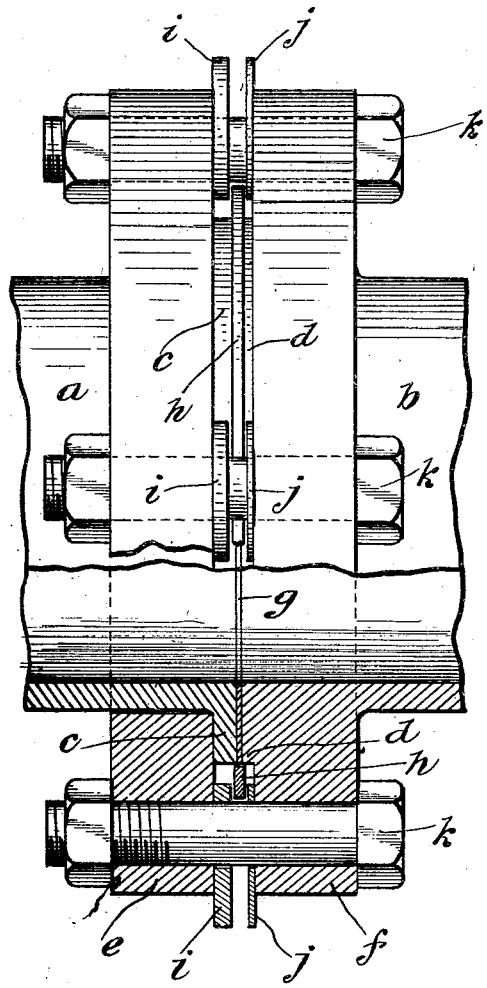

Jan. 27, 1931.　　G. E. WORTHINGTON　　1,790,398
PIPE COUPLING
Filed May 14, 1926

Glenn E. Worthington
INVENTOR

Frank P. Wentworth
his ATTORNEY.

Patented Jan. 27, 1931

1,790,398

UNITED STATES PATENT OFFICE

GLENN E. WORTHINGTON, OF YONKERS, NEW YORK

PIPE COUPLING

Application filed May 14, 1926. Serial No. 108,998.

My invention relates to pipe couplings, and more particularly to a coupling for use in high pressure pipe lines.

Heretofore there have been extensively used high pressure steam lines, in the couplings for which, the flanged ends of adjacent pipe sections and fittings have been provided with co-operating tongues and grooves, the joint being made by means of a gasket in relation to the bottom of the groove and the top of the tongue, so that when the bolts are tightened up, a tight joint is secured at the coupling, whether this coupling be between adjacent pipe lengths or between such pipe lengths and fittings arranged in the line. While such couplings form satisfactory joints, with a necessity for making repairs requiring the taking down of any part of the line, the spreading of the pipe ends in relation to adjacent pipe ends or fittings requires a longitudinal movement of the parts in relation to each other, great enough to require the taking down of a number of adjacent sections or fittings.

Furthermore, in such couplings the flanges of adjacent pipe sections or fittings are dissimilar, or right and left, so that there is always likelihood of mistakes in the preparation of specifications for an equipment, sometimes resulting in long delays in the completion of an installation with a resultant material loss to the constructors or users of a plant or a power unit.

With the above conditions in mind, I have provided a pipe coupling in which the flanges are all of the same construction so far as the making of a tight joint is concerned, so that errors in the drawing of specifications from plans, cannot occur. The construction is such as to not only permit the formation of a tight joint against even those high pressures used in steam turbine plants, but to permit a rapid and convenient making of the coupling, or of the taking down of any section or fitting of a pipe line without the necessity for disturbing any pipe section or fitting other than those adjoining that which is required to be removed for the purpose of making repairs, either by the replacement of a pipe section or a fitting, or the removal of a worn joint making gasket and the substitution of a new one.

The construction of the coupling is such that the pressure developed by the flange bolts in coupling up a line, will result in an effective seal against high pressures, notwithstanding that an all metal gasket is used.

In a coupling embodying the invention, the quantity of machine work for finishing the flanges is reduced to a minimum, the character of the machine work being such as to permit the rapid formation of true surfaces and angles where such are required in making the joint. Since the flanged ends of all pipes and fittings will have no nicely finished projections, as with the tongued flanges now used, likelihood of damage during transportation or handling of the pipe sections or fittings is reduced to a minimum, and no protective packing is required to avoid damage during transportation.

Furthermore, the construction and arrangement of the flanges is such that any fitting or pipe section may be coupled to either end of any other pipe section or fitting, all such fittings and pipe sections being reversible. This permits the reduction of repair stores in a plant to a minimum.

With a pipe coupling embodying my present invention, the construction and arrangement of parts is such that the flanges require merely to be faced off, there being no projections or depressions of any kind at the point thereof where the joint is made. The packing gasket may be a fairly thin, but wide, flat gasket, means being provided to hold this gasket against displacement due to high pressures within the pipe line. In connection with this means for holding the gasket against displacement, are removable means, held in position by the flange bolts, ensuring the proper positioning of the means preventing displacement of the gasket, but permitting movement thereof in a manner to allow the gasket to be forced from between the adjoining pipe sections or fittings, or be located between same, the assembling of the gasket in, or its removal from, the line requiring substantially no spreading of the pipe sections or fittings.

The invention consists primarily in a pipe coupling embodying therein similarly shaped flanged ends of adjoining sections, each having a plane bearing surface and an offset flange having bolt openings therethrough, a thin annular gasket, an annulus encircling the pipe sections intermediate the bolt flanges and of a thickness less than the distance between same, bolts co-operating with the bolt openings in said flanges respectively, and spacers supported from said bolts respectively and projecting between said annulus and a pipe flange, said spacers each being of a width to prevent sufficient movement of said annulus to permit the escape of said gasket but without coming into engaging relation with said annulus; and in such other novel features of construction and combination of parts as are hereinafter set forth and described, and more particularly pointed out in the claims hereto appended.

Figure 2:
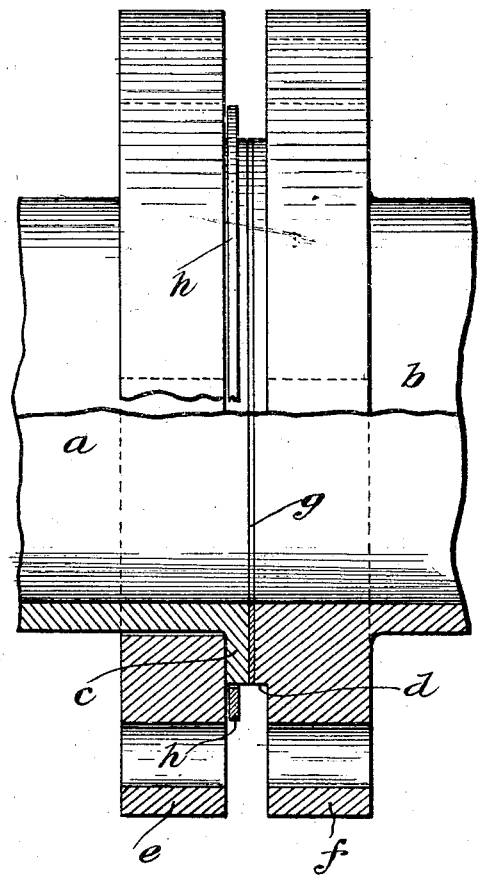

Referring to the drawings,

Fig. 1 is a side view, partly in section, of a coupling embodying my invention, with the joint made up; and Fig. 2 is a similar view with the retaining annulus so positioned as to permit the insertion or removal of the gasket between the flanged ends of adjacent pipe sections.

Like letters refer to like parts in both of said views.

In the embodiment of the invention shown in the accompanying drawings, I have illustrated it in connection with a coupling for two adjacent pipe sections $a$ and $b$. The end of each of these sections is provided with a narrow flange, as $c$ or $d$, which flanges are faced off to form a plane bearing surface. Adjacent each of the flanges $c$ and $d$ are wide bolt flanges $e$ and $f$ which are inset from the ends of the pipe sections so that when the coupling is made, said flanges $e$ and $f$ will be spaced apart for the purpose of facilitating the positioning of a packing gasket between the plane bearing faces of the flanges $c$ and $d$. One of these wide bolt flanges, as $e$, is rotatably and slidably mounted upon its pipe section, and the other bolt flange, as $f$, is formed integrally with the pipe section. If desired, however, each pipe section may be made with either fixed or movable bolt flanges.

It will be understood that the other ends of the sections $a$ and $b$ not shown in the drawings, will have the same construction as the ends of the section $b$ and $a$ shown in the drawings, and notwithstanding that each pipe section may have one fixed bolt flange and one movable bolt flange, the section is reversible, since in other respects both ends thereof are identical in construction. The movable flange is provided merely as a matter of convenience when making up a coupling.

Seated between the plane bearing faces of the flanges $c$ and $d$ is a gasket $g$ which preferably is a flat metallic gasket made of a metal having lower compressive strength than the material of the pipe sections. This gasket is in the form of a fairly wide annulus, its outer diameter being approximately that of the flanges $c$ and $d$ so as to have its perimeter substantially concentric with the perimeters of said flanges.

In a high pressure steam line, there is a constant tendency for the pressures of the fluid to displace the gasket, any substantial displacement of which will offer an obstruction to the flow of the fluid within the pipe. To correct this condition, I provide an annulus $h$ adapted to encircle and have a free sliding fit over the perimeters of the flanges $c$ and $d$ so that it may be brought to a position spanning the space between these flanges and in engaging relation with the adjacent edges of said flanges and the gasket $g$, and thus resist any tendency of the displacement of said gasket by the pressure within the pipe. In order to permit the insertion or removal of a gasket $g$ without any appreciable spreading of the adjacent pipe sections $a$ and $b$, it is essential that the thickness of the annulus $h$ shall be such as to permit it to be moved toward either flange $e$ or $f$, preferably the former when it is a movable flange, to position it to one side of the bearing face upon the narrow flange $c$ or $d$, and to provide means whereby, under normal conditions, such movement of the annulus is not permitted.

The means for positioning the annulus must be removable with relation thereto, and must be of a plurality of short sections. In the form of the invention shown, the means for positioning the annulus $h$ comprises spacers $i$ and $j$, one upon each side of said annulus, the thickness of these spacers being such as to ensure the accurate relation of the annulus and to cause it to be held in position through the engagement of the spacers with the bolt flanges.

I prefer to removably secure the spacers $i$ and $j$ in their operative relation to the gasket $g$ and bolt flanges $e$ and $f$, by passing the flange bolts $k$ therethrough. The spacers $i$ and $j$ may be of any desired configuration, and two or more groups of such spacers should be used to avoid possible play of the annulus $h$.

In a coupling embodying the invention and as described, large effective packing areas are afforded between the gasket $g$ and the plane bearing faces of the flanges $c$ and $d$ when the bolts $k$ are tightened up.

In making a coupling, either end of a pipe section $a$ or $b$, or any fitting in the line may be brought adjacent another fitting or pipe section and a gasket $g$ positioned between the flanges $c$ and $d$.

Before so positioning the sections or fittings, an annulus $h$ is mounted upon the flange c or d. When the gasket is in position, this annulus is brought so as to span the space occupied by the gasket and engage the perimeter of the flanges upon both sides of this space. The spacers i and j are then positioned upon opposite sides of the annulus as shown more particularly in Fig. 1, and the bolts k are passed through the openings in the flanges e and f and tightened up to make the joint.

When taking down a section or fitting, it is merely necessary to remove the bolts k. The removal of these bolts will result in the escape of the spacers i and j, and will permit the pipe or fitting ends to separate to an extent which will afford clearance for the removal of the gasket g. Before the gasket, however, can escape from between the flanges e and f, it is necessary to move the annulus h to one side or the other of the plane of the gasket as shown more particularly in Fig. 2.

With the construction described, no spreading of adjacent pipe sections or fittings is required, since the allowance for shrinkage in the pipe line will cause a more than sufficient separation to permit the removal of the gasket.

It is to be noted that the only finishing operations in a coupling embodying the invention, are the forming of the flanges c and d, e and f and the facing off of the former.

The gasket g may be made in the usual manner, and while a flat gasket has been found to give excellent results, other well known forms of gaskets may be used in lieu thereof. The annulus h may be merely cut from tubular stock.

No close fitting of the annulus with relation to the perimeter of the flanges c and d is required, and a close fitting of the spacers i and j in relation to the annulus h is prohibitive because of the indeterminate amount of movement which may be required when taking up the bolts k in making the joint.

If the pressures developed when taking up the bolts k be sufficient to deform the gasket g, the amount of this deformation will not be material.

When the annulus h is positioned by means of the spacers i and j, the displacement of the gasket g is impossible.

With the construction described, no accuracy in the positioning of the gasket is required, and under no circumstances can any difficulty arise by reason of the improper size or location of bolt openings in a gasket.

It will be noted that the opposite ends of each pipe section or fitting, or in the event of a fitting having a plurality of leads such as a T, all ends of leads, will be of the same construction, there being no male or female parts, and no rights and lefts. This, as stated, avoids any possibility of mistakes when requisitioning or specifying the various sections and fittings necessary for any particular layout so far as the couplings are concerned.

The ends of each section or fitting being perfectly plane, likelihood of breaking or marring in shipment is so remote as to be negligible.

While in the accompanying drawings, I have illustrated four takeup bolts k, it is apparent that ordinarily a greater number of such bolts will be used, the reduced number shown, being illustrated merely to avoid confusion in the drawings.

It is not my intention to limit the invention to the precise details of construction shown in the drawings, it being apparent that such may be varied without departing from the spirit and scope of the invention.

Having described the invention, what I claim as new and desire to have protected by Letters Patent, is:—

1. A pipe coupling embodying therein similarly shaped flanged ends of adjoining sections, each having a plane bearing surface and an offset flange having bolt openings therethrough, a thin annular gasket, an annulus encircling the pipe sections intermediate the bolt flanges and of a thickness less than the distance between same, bolts co-operating with the bolt openings in said flanges respectively, and spacers supported from said bolts respectively and projecting between said annulus and a pipe flange, said spacers each being of a width to prevent sufficient movement of said annulus to permit the escape of said gasket but without coming into engaging relation with said annulus.

2. A pipe coupling embodying therein similarly shaped flanged ends of adjoining sections, each having a plane bearing surface and an offset flange having bolt openings therethrough, one of said flanges being formed integrally with its section, and the other flange being movable upon said section, a thin annular gasket, an annulus encircling the pipe sections intermediate the bolt flanges and of a thickness less than the distance between same, bolts co-operating with the bolt openings in said flanges respectively, and spacers supported from said bolts respectively and projecting between said annulus and a pipe flange, said spacers each being of a width to prevent sufficient movement of said annulus to permit the escape of said gasket but without coming into engaging relation with said annulus.

3. A pipe coupling embodying therein similarly shaped flanged ends of adjoining sections, each having a plane bearing surface and an offset flange having bolt openings therethrough, a thin annular gasket, an annulus encircling the pipe sections intermediate the bolt flanges and of a thickness less than the distance between same, bolts co-operating with the bolt openings in said flanges respectively, and a plurality of spacers supported from said bolts respectively in a position upon opposite sides of said annulus between same and said flanges respectively, said spacers each being of a width to prevent sufficient movement of said annulus to permit the escape of said gasket but without coming into engaging relation with said annulus.

In witness whereof I have hereunto affixed my signature, this 12th day of May, 1926.

GLENN E. WORTHINGTON.